United States Patent [19]
Tsujimoto

[11] Patent Number: 5,859,870
[45] Date of Patent: Jan. 12, 1999

[54] TIME DIVERSITY TRANSMISSION-RECEPTION SYSTEM

[75] Inventor: Ichiro Tsujimoto, Tokyo, Japan

[73] Assignee: NEC Corporation, Tokyo, Japan

[21] Appl. No.: 719,983

[22] Filed: Sep. 24, 1996

[30] Foreign Application Priority Data

Oct. 23, 1995 [JP] Japan .................................. 7-274330

[51] Int. Cl.$^6$ .................................................. H04B 7/02
[52] U.S. Cl. .................... 375/200; 375/267; 370/441; 455/103; 455/137
[58] Field of Search ....................... 375/200, 202, 375/203, 206, 207, 208, 260, 267, 299, 347, 367; 370/441, 515; 455/102, 103, 137, 139, 273, 276.1

[56] References Cited

U.S. PATENT DOCUMENTS

| | | | |
|---|---|---|---|
| 5,335,359 | 8/1994 | Tsujimoto et al. | 455/506 |
| 5,349,609 | 9/1994 | Tsujimoto | 375/347 |
| 5,467,367 | 11/1995 | Izumi et al. | 375/206 |
| 5,524,023 | 6/1996 | Tsujimoto | 375/232 |
| 5,550,811 | 8/1996 | Kaku et al. | 370/342 |
| 5,568,523 | 10/1996 | Tsujimoto | 375/347 |
| 5,594,754 | 1/1997 | Dohi et al. | 375/200 |
| 5,596,601 | 1/1997 | Bar-David | 375/207 |
| 5,598,428 | 1/1997 | Sato | 375/206 |
| 5,621,769 | 4/1997 | Wan et al. | 375/347 |
| 5,623,511 | 4/1997 | Bar-Dadid et al. | 375/207 |
| 5,636,242 | 6/1997 | Tsujimoto | 375/200 |
| 5,646,964 | 7/1997 | Ushirokawa et al. | 375/347 |
| 5,652,765 | 7/1997 | Adachi et al. | 375/211 |
| 5,675,608 | 10/1997 | Kim et al. | 375/208 |
| 5,687,162 | 11/1997 | Yoshida et al. | 370/203 |
| 5,692,006 | 11/1997 | Ross | 375/200 |
| 5,692,018 | 11/1997 | Okamoto | 375/347 |
| 5,757,853 | 5/1998 | Tsujimoto | 375/200 |

FOREIGN PATENT DOCUMENTS

| | | |
|---|---|---|
| 63-286027 | 11/1988 | Japan . |
| 3284011 | 12/1991 | Japan . |
| 697914 | 4/1994 | Japan . |

Primary Examiner—Young T. Tse
Attorney, Agent, or Firm—Sughrue, Mion, Zinn, Macpeak & Seas, PLLC

[57] ABSTRACT

A time diversity transmission-reception system has, on transmit side, at least one delay of a predetermined delay for providing at least a pair of delayed and undelayed data symbol sequences, at least a pair of modulators for modulating the data symbol sequences into modulated intermediate frequency signals, and at least a pair of spread spectrum signal generators employing mutually different pseudo-random code sequences for code division multiplexing. On receive side, the received signals are subjected to code division demultiplexing, demodulation, and delaying to restore at least a pair of timed demodulated signals. These signals are then subjected to adaptive matched filtering, whose outputs are combined and applied to adaptive equalization to provide diversity reception signal. The present system provides a plurality of diversity branches without employing a plurality of frequencies, planes of polarization of a carrier wave or receiving antennas. Also, principal part of the system of the present invention can be readily integrated into LSI's, contributing to the reduction of manufacturing cost.

4 Claims, 7 Drawing Sheets

TIME DIVERSITY TRANSMISSION-RECEPTION SYSTEM

BACKGROUND OF THE INVENTION

(1) Field of the Invention

The present invention relates to a diversity transmission-reception system, and more particularly to a time diversity transmission-reception system utilizing code division multiplexing.

(2) Description of the Related Art

Diversity reception is generally necessary for radio communication involving fading channels, and particularly for digital communication through fading multipath channels. Signal fading is classified into two, i.e., flat fading and frequency-selective fading. Flat fading occurs as the amplitude and phase variation in the propagated signal, which has been received directly rather than through fading multipath channels. In contrast, frequency-selective fading occurs as a result of propagation through fading multipath channels, each of which causes mutually independent amplitude and phase variations to the signal propagated therethrough. In frequency-selective fading, where the reception signal is obtained through combining a plurality of signals propagated through fading multipath channels, the received signals at some frequencies may have mutually opposite phases resulting in zero amplitude. This causes frequency-selective fades or notches in the frequency spectrum of the reception signal. While the effect of flat fading is limited to the level of the reception signal with the waveform thereof unaffected, the frequency-selective fading resulting from propagation through fading multipath channels causes the variation not only in reception signal level but also in its waveform.

To obviate the adverse effect of fading multipath channels, diversity techniques and adaptive equalization techniques have been conventionally utilized. Among a variety of possible combinations of these techniques, the present invention is directed to the use of time diversity combined with adaptive equalization.

Referring to FIGS. 1(a) and 1(b) showing respectively in blocks the transmit and receive sides of a conventional time diversity transmission-reception system, a data signal (data symbol sequence) "a" to be transmitted is split into two and supplied, one through delay means 101 (having delay t) and the other directly, to a pair of modulators 102 for modulation into modulated intermediate frequency (IF) signals, and then to a pair of transmitters 103 of carrier wave radio frequencies (RF) $f_1$ and $f_2$, whose outputs are combined at a combiner 104 and transmitted through a transmitting antenna 105. As a result, the two-branch transmit signals are transmitted at radio frequencies $f_1$ and $f_2$ with a time spacing of t. On the receive side shown in FIG. 1(b), the RF signal received by receiving antenna 106 is applied to a branching filter 107, which splits the received RF signal into the $f_1$ and $f_2$ components. These frequency components are respectively supplied to a pair of receivers 108 for amplification and conversion into intermediate frequency (IF) and then to a pair of demodulators 109 for synchronous detection. The output of demodulator 109 derived from the $f_1$ component is then supplied through delay means 110 of delay t to optimum signal selector/signal combiner 111, while the output of demodulator 109 derived from the $f_2$ component is supplied directly to selector/combiner 111. The selector/combiner 111 may consist of a signal selector for selecting the demodulation output signal of better quality out of the two incoming demodulation output signals in response to bit error rates and/or loss of frame synchronization. Alternatively, selector/combiner 111 may be composed of a diversity signal combiner designed to combine the two incoming demodulation output signals after phase-controlling them into timed state. The signal combiner may be made of a maximal ratio combiner designed not only to control the phases of the incoming signals into timed state but also to control their amplitudes to provide squared and unsquared values thereof. The output of selector/combiner 111 is supplied to adaptive equalizer 112 for eliminating waveform distortions caused by propagation through fading multipath channels, to provide reception data signal A.

The conventional system shown in FIGS. 1(a) and 1(b) may be called a frequency diversity system because two carrier waves of radio frequencies $f_1$ and $f_2$ are employed. However, this conventional system cannot achieve the frequency diversity effect if the $f_1$-$f_2$ correlation is high enough to make the separation therebetween inadequate. On the other hand, delay t given to the second branch transmit signal provides the time diversity effect, if delay t is set at a value longer than the fading period.

In general, the $f_1$-$f_2$ correlation cannot be reduced without expanding the frequency separation therebetween, which is undesirable from the viewpoint of the more efficient use of frequencies. Therefore, the conventional system shown in FIGS. 1(a) and 1(b) depends more heavily on time diversity, with the frequency diversity used only for the purpose of providing time diversity branches. However, the use of two radio frequency carrier waves at frequencies $f_1$ and $f_2$ requires the use of two transmitters 103 and two receivers 108, which are generally of large scale and costly to manufacture. Furthermore, the problem of dimensions, scale and manufacturing cost of the transmitter/receiver for the conventional system becomes more serious when the number of diversity branches is increased to more than two.

Another prior art diversity transmission-reception system, which is outlined in Japanese Patent Application Kokai Publication No. Sho 63-286027 entitled "Transmission-path diversity-transmission system" and published Nov. 22, 1988, has, as schematically shown in FIG. 2, modulator 201 for data signal, whose output is supplied to a first transmitting antenna 203 directly and also to a second transmitting antenna 204 through a delay circuit 202 having delay t. On the receive side, the reception system has one receiving antenna 205, whose output is supplied to receiver 206, where the received RF signal is converted into an IF signal for detection by detector 207. The output of detector 207 is applied to waveform equalizer 208 for code decision by decision circuit 209. The delay t introduced by delay circuit 202 is set at a value longer than one time slot assigned to each of the modulating data symbols. The transmission carrier wave transmitted from the first and second transmitting antennas is propagated through mutually independent propagation paths, and subsequently received by a single receiving antenna 205. Therefore, the propagated signal consists of a plurality of multipath waves, whose undelayed and delayed components have respectively undergone Rayleigh fading mutually independently. Waveform equalizer 208 is designed to select either the undelayed or delayed wave, while eliminating the unselected wave, thereby to realize two-branch selective diversity reception. It is also described in the above-mentioned Kokai Publication that the undelayed and delayed waves are time-adjusted and combined by maximal ratio combining.

The prior art system of FIG. 2 is based on the concurrent use of time diversity and space diversity reception systems in that it utilizes the absence of spatial correlation among propagation paths. While a space diversity reception system ordinarily requires a plurality of receiving antennas, the above-cited prior art system has two transmitting antennas and a single receiving antenna, reducing the equipment size on the receive side and curtailing the manufacturing cost. The reduction of the number of receiving antenna to one is significant for a microwave communication system, which requires large-aperture antennas and associated equipment in contrast to terrestrial mobile communication systems requiring only small-sized antennas.

In the conventional diversity reception systems outlined above, either frequency or space (propagation path) must be relied on as transmission media. Particularly, in the time diversity reception concurrently employing frequency diversity for separation and derivation of diversity branches, the expansion of required frequency bandwidth and equipment scale is unavoidable, resulting in increased manufacturing cost. Similarly, the time diversity reception accompanied by space (propagation path) diversity requires a plurality of antennas, increasing the manufacturing cost particularly when the antennas are of large aperture type. Furthermore, the increase in the number of diversity branches in the above-mentioned time diversity reception system accompanied by either frequency or space diversity makes the abovementioned problems more serious.

SUMMARY OF THE INVENTION

An object of the invention, therefore, is to overcome the problems associated with the prior art and to provide a time diversity transmission-reception system adapted to realize time diversity transmission-reception utilizing spread spectrum-based code division multiplexing.

According to the present invention, there is provided a time diversity transmission-reception system, in which the time delay differences existing among the received signals split through the code division demultiplexing and then demodulated are eliminated so that the received signals may then be supplied to adaptive matched filters, whose outputs are combined and then supplied to adaptive equalizer.

In the present invention, the transmission signal on the transmit side may be split into more than two signals, which may be subjected to mutually different delays to provide a plurality of time diversity transmission signals.

BRIEF DESCRIPTION OF THE DRAWINGS

The above and other objects, features and advantages of the present invention will be apparent from the following description of preferred embodiments of the invention taken with reference to the accompanying drawings, in which.

PREFERRED EMBODIMENTS OF THE INVENTION

Figure 1A:
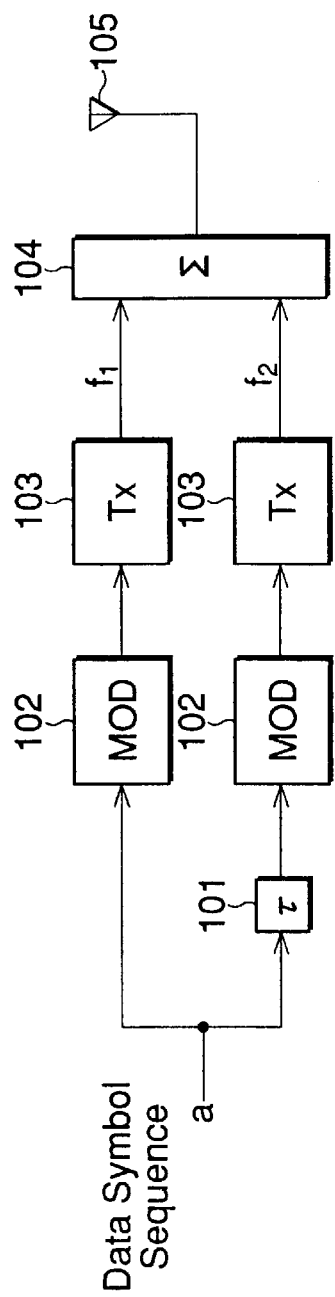
FIGS. 1(a) to 1(b) show in blocks an example of the prior art time diversity transmission-reception system utilizing frequency diversity concurrently.
Figure 1B:
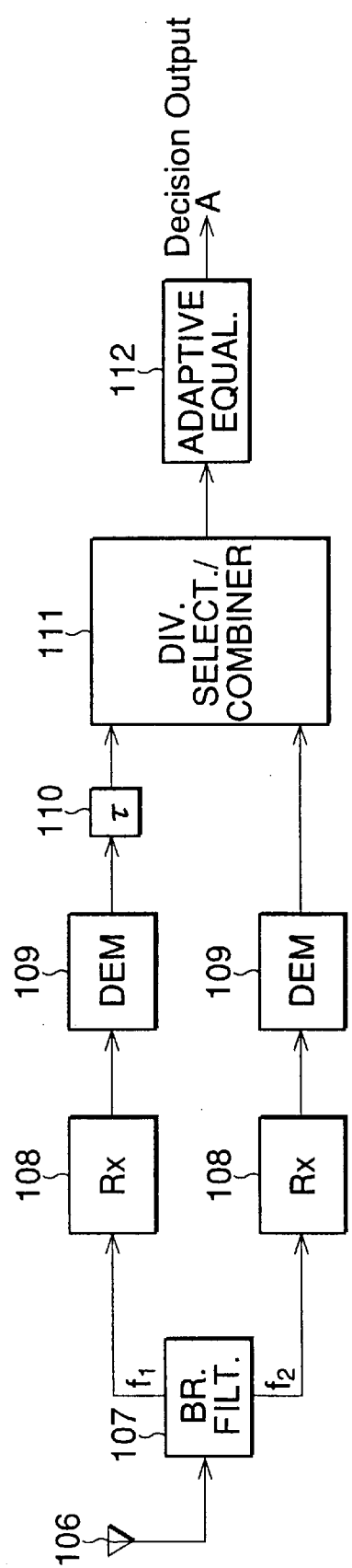
Figure 2:
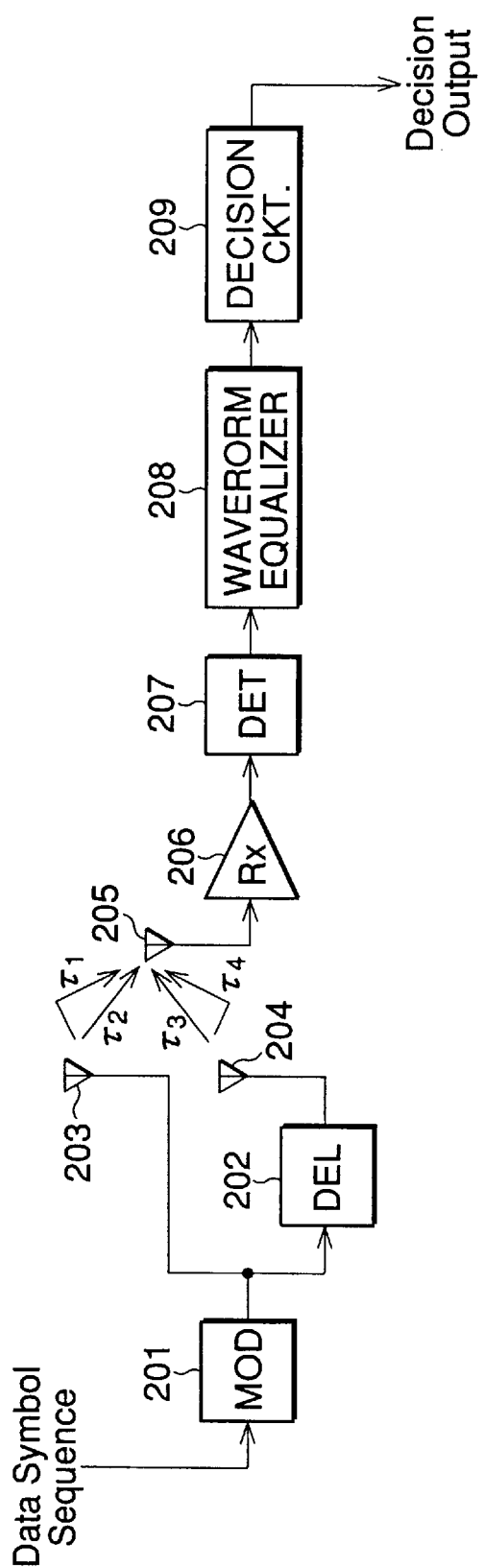
FIG. 2 shows in blocks another example of the prior art time diversity transmission-reception system utilizing space diversity concurrently.

Now, preferred embodiments of the invention will be described with reference to the drawings, in which like structural elements as in the prior art described above are denoted by like reference numerals with their description unrepeated.

Figures 3A, 3B:
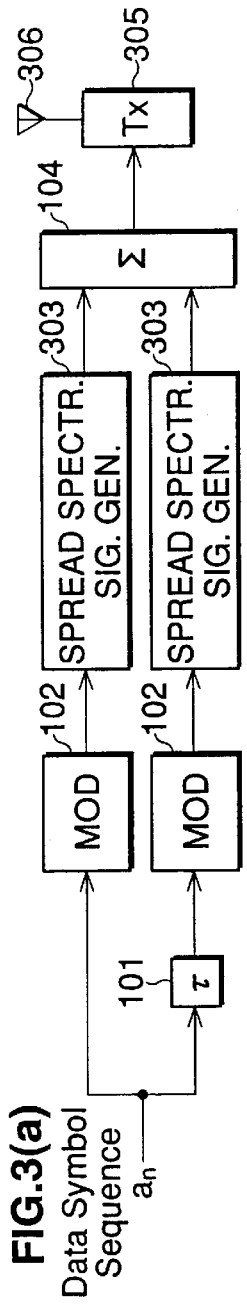
FIGS. 3(a) and 3(b) show in blocks a time diversity transmission-reception system embodying one feature of the present invention, in which the number of diversity branches is two.

Referring to FIG. 3(a) showing in blocks the transmit side of a first embodiment of the present invention, the pair of outputs of modulators 102, which are supplied with a data signal (symbol sequence) $a_n$, one directly and the other through delay means 101 of delay t (greater than signal fading period), are supplied to a pair of spread spectrum signal generators 303 employing mutually different pseudo-noise code sequences for code division multiplexing, whose outputs are combined at combiner 104 for transmission as an RF signal through transmitter 305 and transmitting antenna 306. As shown, two code division multiplexed channels are assigned respectively to two diversity branches, which are defined by delay t and formed by an RF signal of a single frequency.

On the receive side of the first embodiment of the present invention shown in FIG. 3(b), the RF signal propagated through the fading multipath channels is received at receiving antenna 307 and applied through a receiver 308, which is for low-noise amplification and conversion into intermediate frequency (IF), to a pair of spectrum-unspread signal restoring (code division demultiplexing) circuits 309, whose outputs are demodulated at demodulators 109, with an IF local oscillation signal supplied thereto from a local oscillator 315 for quasi-synchronous detection. A pair of demodulated outputs from demodulators 109 are supplied, one through delay means 110 of delay t and the other directly, to a pair of adaptive matched filters 312, whose outputs are summed at combiner 313 and then applied to adaptive equalizer 112 to provide reception data signal An. Each of the adaptive matched filters 312 has: first and second delay elements 312a1 and 312a2 of delay T/2 (where T denotes symbol period of the output from the demodulator 109) connected in series with respect to the output of demodulators 109; first, second and third complex multipliers 312b1, 312b2 and 312b3 receiving inputs from taps P, Q and R defined by the serially connected first and second delay elements 312a1 and 312a2; a summer 312c; and first, second and third complex correlation circuits 312d1, 312d2 and 312d3, which are adapted to take correlation between the output of the adaptive equalizer 112 and the above-mentioned outputs from taps P, Q and R, respectively, and to supply their correlation outputs to complex multipliers 312b1, 312b2 and 312b3, respectively. The delay t given by delay means 110 to the first diversity branch brings both the first and second diversity branches into timed state due to the same amount of delay t given to the second diversity branch on the transmit side shown in FIG. 3(a).

Each of the adaptive matched filters 312 supplied with the demodulation output is adapted to predict time-variant impulse response characteristics of transmission paths and to convolute into received signal the time-reversed complex conjugate values of the prediction results. It generally follows, therefore, that an adaptive matched filter has the structure of a transversal filter. In the embodiment shown in FIGS. 3(a) and 3(b), the adaptive matched filter 312 has three taps P, Q and R having a tap interval of T/2 (where T is the modulating symbol period). According to communication theory, matched filtering of a received signal maximizes SNR (signal to noise power ratio). This is due to the fact that the signal power, which has been time-dispersed by multipath channel propagation, is spread over the taps of the adaptive matched filter to allow the time-dispersed signal power to be time-concentrated or matched by transversal filtering for maximal ratio combining of signals on those taps.

To describe the function of adaptive matched filter 312, the transmission path model is assumed to result in a principal signal wave accompanied by two T/2-delayed waves propagated through multipath channels. Assuming that the principal signal wave component $h(0)a_n$ is distributed to middle tap Q, first tap P is supplied with a signal component $h(T/2)$ corresponding to the T/2-delayed one. It is noted here that $h(\ )$ denotes complex amplitude value $h(t)$ of an impulse response. It is also noted that the signal components at taps P, Q and R are applied to the three complex correlators 312d1, 312d2 and 312d3, which take correlation of the respective signal components with the output signal $A_n$ of adaptive equalizer 112 to provide weighted coefficients $W_{11}$, $W_{12}$ and $W_{13}$, respectively. These coefficients $W_{ij}$ (i=1, 2, 3; J=1, 2, 3; where i stands for the i-th diversity branch and j for j-th tap of the adaptive matched filter), which are multiplied respectively at multipliers 312b1, 312b2 and 312b3 with the above-mentioned signal components supplied from taps P, Q and R, can be calculated as follows:

$$W_{11}=E\ [h^*(T/2)a_n \times A_n] \quad (1)$$

$$W_{12}=E\ [h^*(0)a_n \times A_n] \quad (2)$$

where E[ ] means integrating operation for time-averaging complex called expectation value operation, and * means conjugate complex values.

In this correlation operation, when the bit error rate is in the order of $10^{-2}$, the following approximation holds:

$$A_{n>>an} \quad (3)$$

On the other hand, since the data signal $a_n$ on the transmit side can be approximated to M series of pseudo-noise (PN) signals, the following autocorrelation coefficients hold:

$$E[ai^*aj]=d_{ij}=1(i=j)\ or\ 0(i^1 j) \quad (4)$$

As a result, equations (1) and (2) are transformed respectively to:

$$W_{11}=h^*(T/2) \quad (5)$$

$$W_{12}=h^*(0) \quad (6)$$

It follows, therefore, that the signal components derived respectively from taps P and Q and multiplied respectively at multipliers 312b1 and 312b2 by coefficients $W_{11}$ and $W_{12}$ and summed at summing circuit 312c to constitute the matched filter output is given by:

$$h^*(T/2)h(T/2) \times a_n + h^*(0)h(0) \times a_n \quad (7)$$

The first term of the above expression gives, as coefficients for modulating data symbols $a_n$, squared components of response to delayed wave, while the second term gives squared components of response to principal wave, with both the first and second terms giving real numbers. It is seen from this expression that time-dispersed data symbols $a_n$ resulting from propagation through multipath medium are time-matched for maximal ratio combining. This is equivalent to the so-called time diversity signal combining, whose gain is called implicit diversity gain. While the quasi-synchronous detection performed at the above-mentioned demodulators 109 is not a full synchronous detection, the difference between the quasi- and full-synchronous detection appears as the rotation of phase angle of impulse response. This phase angle rotation is canceled, as shown in expression (7), by the product of the impulse response and its conjugate complex values. In this way, the adaptive matched filter exhibits the function of carrier synchronization.

The similar matched filtering is performed at the second adaptive matched filter 312, so that the outputs from the two adaptive matched filters 312 may be combined by combiner 313 to maximize their SNR.

The spread spectrum signals employed in the present invention for the code division multiplexing do not easily suffer from waveform distortion, which is otherwise caused by fading multipath channels. This is particularly true when multipath-propagated signal waves have no correlation with principal signal wave, wherein multipath-propagated signal waves are suppressed by spectrum spreading. In other words, in those cases where the effect of fading multipath channels is light enough to make the delay of the principal wave small, correlation between the principal and the delayed signal waves becomes greater then negligible, making it impossible to suppress signal waves (propagated through multipath channels) by the use of spread spectrum signals. In such a case, it is desirable to positively utilize as valid signals those signal waves propagated through multipath channels. The adaptive matched filters 312 are employed in the present invention to utilize those multipath-propagated signals.

The output of the combiner 313 is applied to adaptive equalizer 112 to eliminate code-to-code interference, which has been caused by multipath medium but has already been reduced considerably by the above-mentioned matched filtering. Adaptive equalizer 112 may be of the adaptive filter-based type or of the MLSE (Maximum Likelihood Sequence Estimation) -based type. While the former can be linear filter-based one or nonlinear filter-based one, a nonlinear filter-based decision feedback-type equalizer (DFE) provides more powerful equalization when combined with a matched filter.

While the relationship between adaptive matched filter and multipath channels has been described above, the effect of diversity reception achievable by the present invention in the absence of propagation through multipath channels will now be described.

Figure 4:
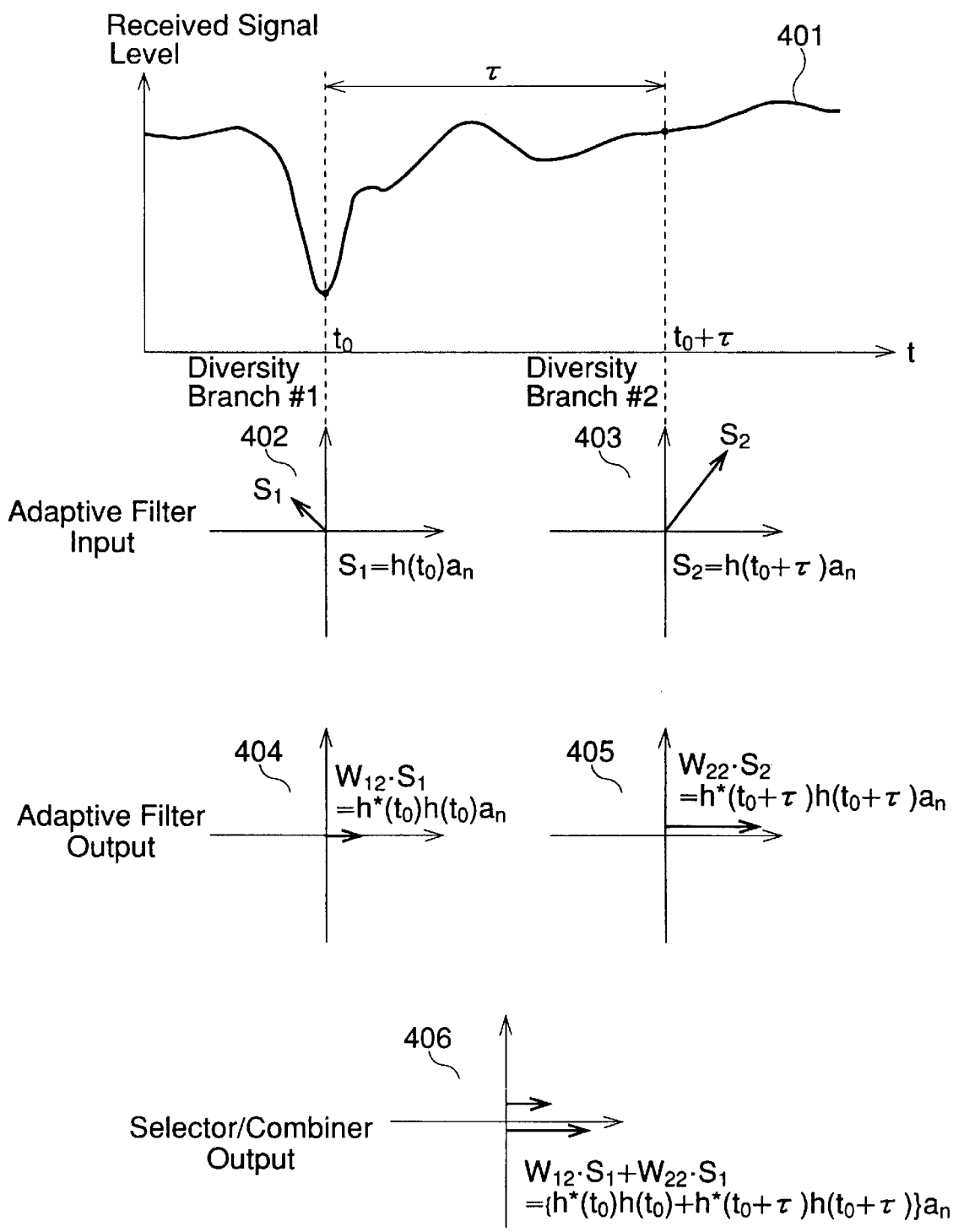
FIG. 4 illustrates the operation of the system of FIGS. 3(a) and 3(b), when no multipath propagation is involved.

Referring to FIG. 4 illustrating the operation of the system of FIGS. 3(a) and 3(b), curve 401 shows time variation of the received signal level; reference numeral 402 shows signal vector $S_1$ of the signal received at the input to the adaptive matched filter 312 of the first diversity branch; 403, signal vector $S_2$ of the signal received at the input to the adaptive matched filter 312 of the second diversity branch; 404, signal vector of the signal at the output of the adaptive matched filter 312 of the first diversity branch; 405, signal vector of the signal at the output of the adaptive matched filter 312 of the second diversity branch; and 406, signal vector at the output of the combiner 313.

In the absence of multipath-propagated waves, the adaptive matched filter 312 performs the ordinary maximal ratio combining for the principal waves exhibiting signal vectors $S_1$ and $S_2$.

It is assumed here, as shown in FIG. 4 by curve 401, that the received signal level suffers at time $t=t_0$ (first diversity branch) a deep fade caused by signal fading, while it exhibits no fading effect at time $t=t_0+t$ (second diversity branch). In this situation, the signal transmitted through the first branch at $t=t_0$ is given by the product of data signal $a_n$ and complex transfer coefficients $h(t_0)$. On the other hand, data signal $a_n$ is transmitted again after the lapse of t through the second diversity branch, whose received signal is given by the product of $a_n$ and h $(t_0+t)$.

Since the time matching is achieved on the receive side by delaying the received signal on the first diversity branch by t, the received signals $S_1$ and $S_2$ at the input to the middle tap Q of adaptive matched filter 312 are given by:

$$S_1 = h(t_0) \times a_n \quad (8)$$

$$S_2 = h(t_0+t) \times a_n \quad (9)$$

With correlation values $W_{12}$ and $W_{22}$ provided by complex correlators 312d2 of each of the first and second diversity branches, the output y from combiner 113 is given by:

$$y = W_{12} S_1 + W_{22} S_2 \quad (10)$$

Substitution of the terms in equation (10) with equations (8) and (9) gives:

$$y = \{W_{12} \times h(t_0) + W_{22} \times h(t_0+t)\} \times a_n \quad (11)$$

Tap coefficients $W_{12}$ and $W_{22}$ are given, similarly to equations (5) and (6) above, by:

$$\begin{aligned} W_{12} &= E[\{h(t_0)a_n\}^* \times a_n] \quad (12)\\ &= E[h^*(t_0)] \times E[a_n^* a_n]\\ &= h(t_0)^* \\ W_{22} &= E[\{h(t_0+t)a_n\}^* \times a_n] \quad (13)\\ &= E[h^*(t_0+t)] \times E[a_n^* \times a_n]\\ &= h(t_0+t)^* \end{aligned}$$

Therefore, the output of combiner 313 expressed by equation (11) above is given by:

$$y = h(t_0)^* \times h(t_0) \times a_n + h(t_i+t)^* \times h(t_0+t) \times a_n \quad (14)$$

It should be noted here that the transfer coefficients for multiplication with data symbols $a_n$ has a dimension of power and is in real number. To describe this with reference to the vector diagrams of FIG. 4, the multiplication of signal vector $S_1$ in vector diagram 402 with $W_{12}$ leads to the state of vector diagram 404, in which the signal phase coincides with the real number axis. The amplitude in this vector diagram is controlled in accordance with the expression $h(t_0)^* \times h(t_0)$ and the square thereof. Similarly, signal vector $S_2$ in vector diagram 403 is controlled, in terms of its phase, into the real number axis and, in terms of its amplitude, into the square thereof, as shown in vector diagram 405. Signal vectors shown in diagrams 404 and 405 are directly combined at combiner 313, realizing maximal ratio combining (MRC) of signal vectors $S_1$ and $S_2$.

The effect of MRC will now be described with reference to curve 401 of FIG. 4. The terms $h(t_0)$ and $h(t_0+t)$ are spaced in time by t and each of them is subjected to Rayleigh fading. In the presence of deep signal fading at $t=t_0$ as shown by curve 401 in FIG. 4, the amplitude of transfer coefficient h $(t_0)$ is close to zero. On the other hand, at $t=t_0+t$, where fading is not present, $h(t_0+t)$ ehibits an amplitude corresponding to the received signal level. This results in level variation in signal vectors $S_1$ and $S_2$ without any correlation therebetween. Therefore, the maximal ratio combining of signal vectors $S_1$ and $S_2$ realizes time diversity reception.

Figure 5:
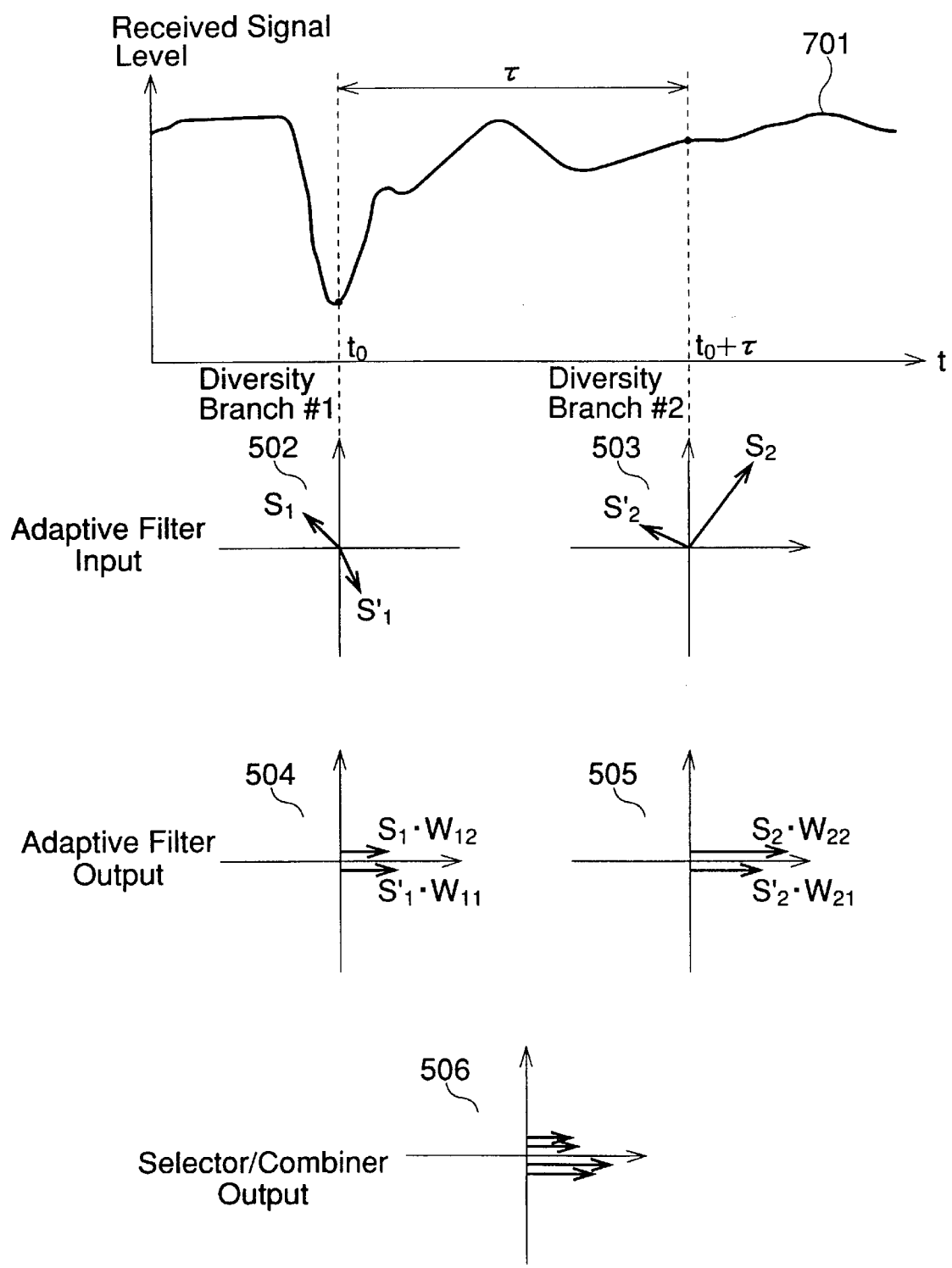
FIG. 5 illustrates the operation of the system of FIGS. 3(a) and 3(b) when multipath propagation is involved.

The diversity effect achieved by the present invention in the presence of multipath propagation will now be described with reference to FIG. 5. As in the case of FIG. 4, curve 501 shows time variation of received signal level. Similarly, reference numerals 502 to 506 show vector diagrams corresponding to those denoted by reference numerals 402 to 406, respectively. The illustration in FIG. 5 differs from that of FIG. 4 only in that the signal vectors shown therein are affected by multipath propagation, resulting in principal wave and delayed wave. In vector diagram 502 of FIG. 5, signal vector $S_1$ of principal wave is shown accompanied by signal vector $S_1'$ of delayed wave. These principal and delayed wave components resulting from multipath propagation are subjected to maximal ratio combining by adaptive matched filters 312. More specifically, as shown in vector diagram 504, signal vectors $S_1$ and $S_1'$ on the first diversity branch are multiplied by tap coefficients $W_{12}$ and $W_{11}$, respectively, to bring the phases of the signal vectors $S_1$ and $S_1'$ into in-phase state on the real number axis and to bring their amplitudes into unsquared-squared value relationship. Similarly, signal vectors $S_2$ and $S_2'$ on the second diversity branch shown in vector diagram 503 are multiplied by tap coefficients $W_{22}$ and $W_{21}$, respectively, to provide resultant signal vector as shown in vector diagram 505. To take a close look at the first diversity branch, the received signal is never interrupted even if the level of the signal vector $S_1$ of the received principal wave is lowered, so far as the level of the received delayed wave is not lowered. It follows, therefore, that the effect of dual diversity reception can be achieved even if only one diversity branch is utilized. Thus, each of the diversity branches provides the implicit diversity gain to enhance received signal level for signal combining of improved quality. This leads to signal combining of virtual quadruple diversity reception. Comparison of the vector diagram 505 of FIG. 5 with the corresponding diagram 405 of FIG. 4 shows that the presence of multipath propagation provides enhanced diversity reception effect.

Figure 6A:
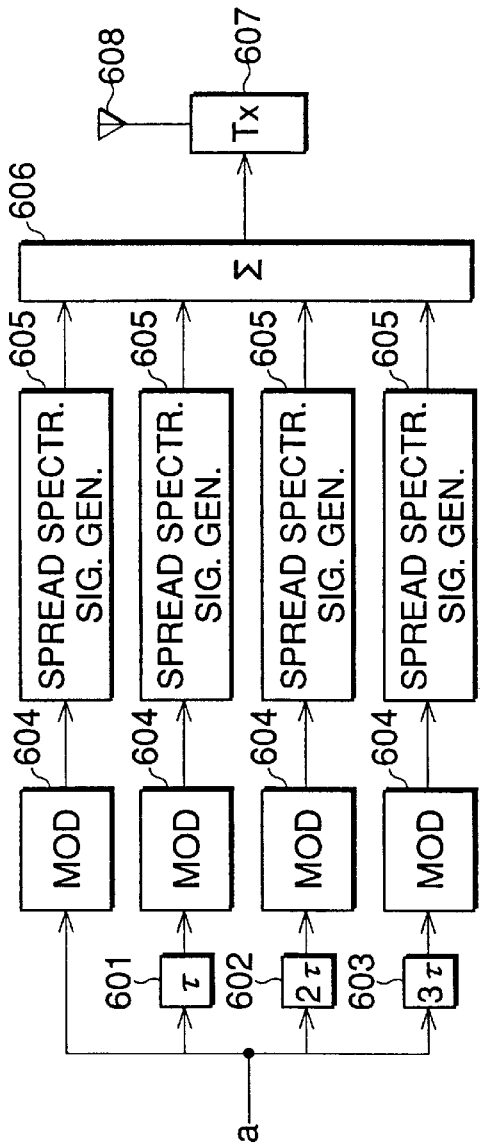
FIGS. 6(a) and 6(b) show in blocks a time diversity transmission-reception system embodying another feature of the present invention, in which the number of diversity branches is four.
Figure 6B:
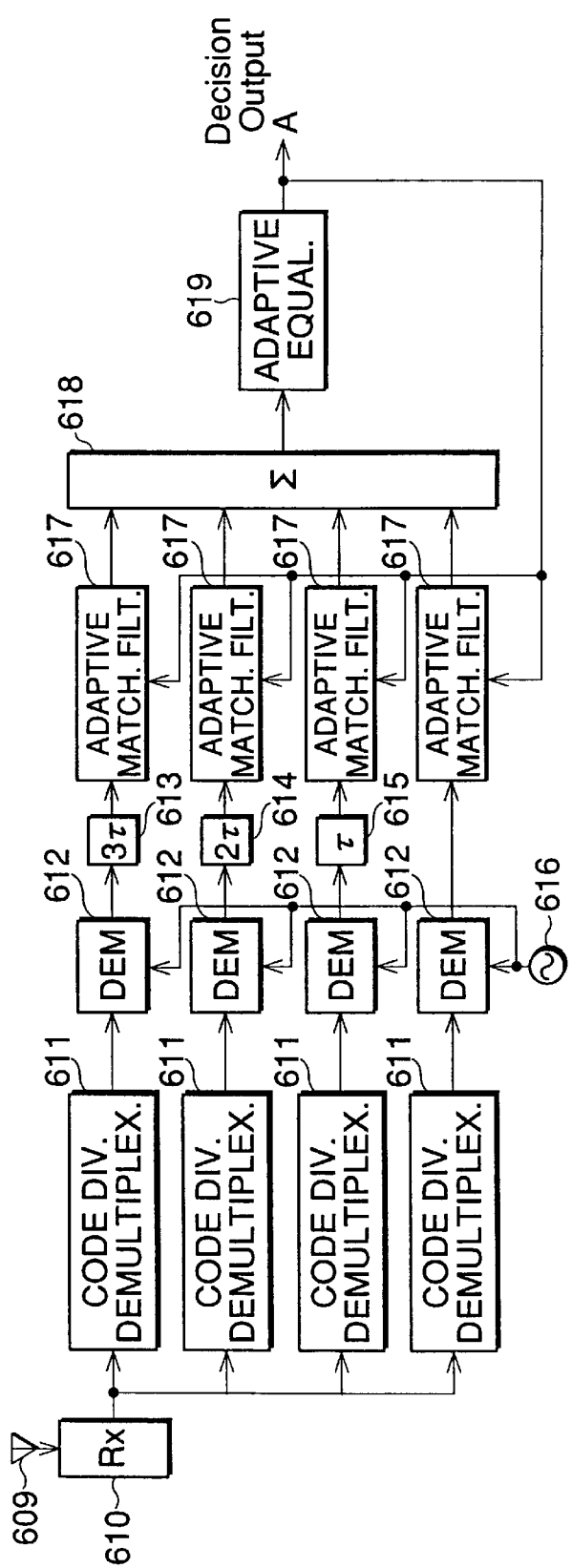

While the embodiment described above with reference to FIGS. 3(a), 3(b), 4 and 5, which has two diversity branches, is effective enough to achieve practically adequate diversity reception effect in most cases, this arrangement is not capable of preventing reception signal interruption if signal fade occurs at both $t=t_0$ and $t=t_0+t$. To overcome the problem of such reception signal interruption and thereby to enhance the quality of communication channels, the number of diversity branches must be increased. FIGS. 6(a) and 6(b) show a second embodiment of the present invention designed to meet such demand. Referring to FIG. 6(a) showing the transmit side of a time diversity transmission-reception system having four diversity branches, reference numerals 601, 602 and 603 denote delay means of delay t, 2t, and 3t, respectively; 604, four modulators; 605, four spread spectrum signal generators; 606, signal combiner; 607, RF transmitter; and 608, transmitting antenna. On the receive side shown in FIG. 6(b), the reference numeral 609 denotes receiving antenna; 610, RF receiver; 611, four spectrum-unspread signal generators (code division demultiplexers); 612, four demodulators; 613, 614 and 615, delay means having delay 3t, 2t, and t, respectively; 616, a local oscillator for providing local oscillation at intermediate frequency to the four demodulators; 617, four adaptive matched filters; 618, signal combiner; and 619, adaptive equalizer. The operation of the embodiment of FIGS. 6(*a*) and 6(*b*) is identical to that of FIGS. 3(*a*) and 3(*b*) except that the number of diversity branches is increased to four. Delay means 601 to 603 on the transmit side and delay means 613 to 615 on the receive side are for defining the four diversity branches on the transmit side and for restoring the timed relationship of the four branches on the receive side, respectively.

Figure 7:
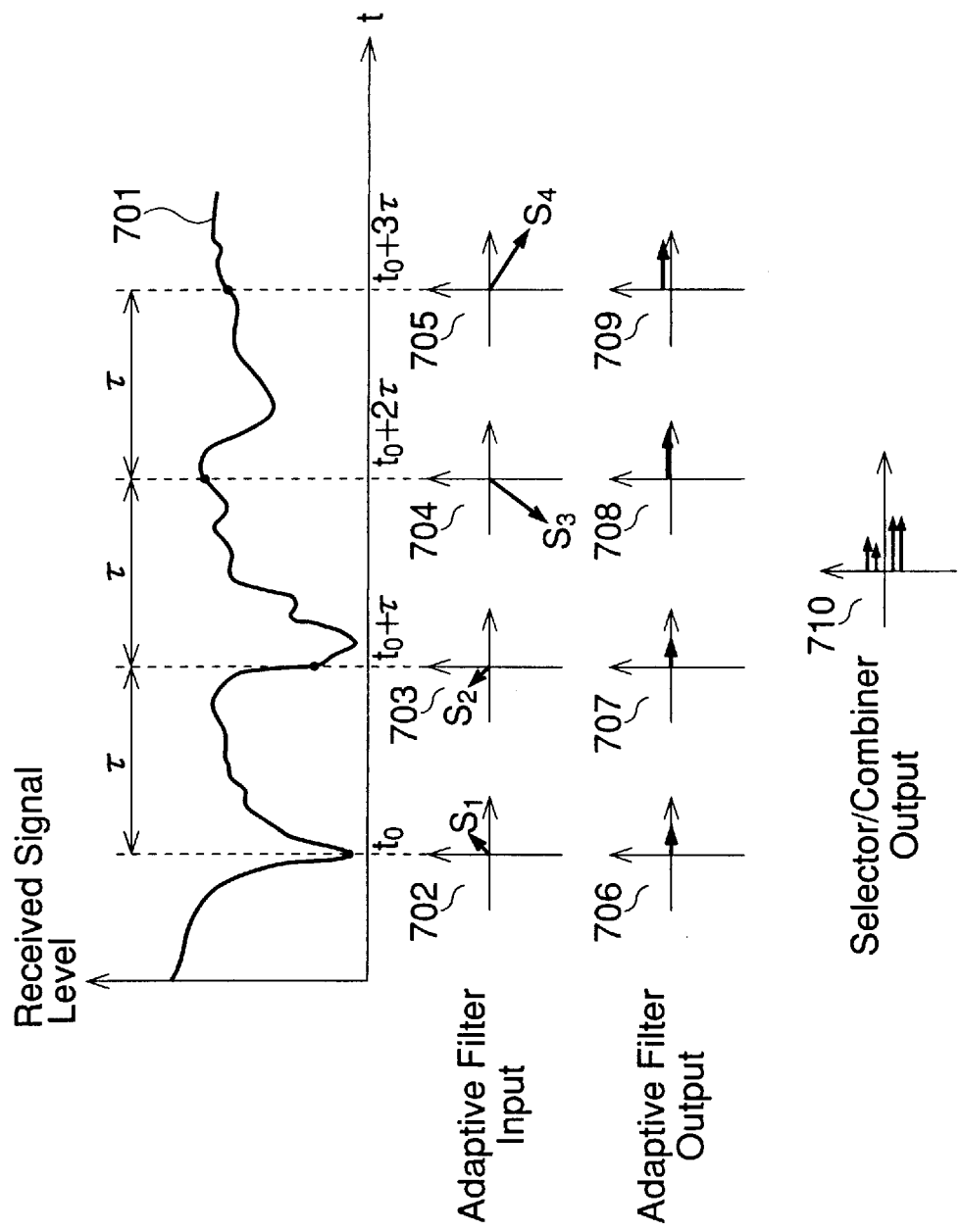
FIG. 7 illustrates the operation of the system shown in FIGS. 6(a) and 6(b).

Referring to FIG. 7 illustrating the operation of the system of FIGS. 6(*a*) and 6(*b*), curve 701 shows time variation of the receive signal level: reference numerals 702, 703, 704 and 705, signal vectors of the inputs to the adaptive matched filters of the first, second, third and fourth diversity branches, respectively; reference numerals 706, 707, 708 and 709, signal vectors of the outputs from the adaptive matched filters 617 of the first, second third and fourth diversity branches, respectively; and 710, signal vector of the output of combiner 618.

The curve 701 shows that signal fade occurs both at t=$t_0$ (first diversity branch) and t=$t_0$+t (second diversity branch). As described above, such signal fade results in the reception signal interruption in dual diversity transmission-reception system as shown in FIGS. 3(*a*) and 3(*b*). In the embodiment shown in FIGS. 6(*a*) and 6(*b*), however, there is no signal fades at t=$t_0$+2t (third diversity branch) and t=$t_0$+3t (fourth diversity branch). As a result, the reception signal obtained by combining the received signals through the first to fourth diversity branches does not involve signal interruption. Thus, the increase in the number of diversity branches contributes to the reduction of the probability of reception signal interruption. The description of signal vectors given above with reference to FIGS. 4 and 5 is applicable to signal vectors 702 to 709 shown in FIG. 7, with the only difference of the latter from the former residing in the number of diversity branches.

It will be seen from the foregoing description of the embodiments that a plurality of diversity branches can be provided without employing a plurality of radio frequencies or planes of polarization of carrier waves or a plurality of receiving antennas. It will be also seen in the embodiments that the application of spread spectrum-based code division multiplexing for each of the time-based diversity branches further increases the number of virtual diversity branches, contributing to further enhancement of the quality of transmission channels. The present invention is also advantageous in that those circuit units employed in the diversity system such as spread spectrum signal generator, modulator means and demodulator means can be readily integrated into LSI's, making it possible to further reduce the manufacturing cost of the diversity transmission-reception system.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A time diversity transmission-reception system for transmitting a data signal by a radio frequency carrier wave having a plurality of diversity branches defined by a predetermined delay given to said data signal at transmit side of said system at a stage prior to a plurality of means for converting said data signal into a plurality of modulated intermediate frequency subcarriers, said converting means being assigned respectively to said diversity branches, wherein said system comprises on transmit side:

a plurality of means responsive respectively to said modulated intermediate frequency subcarriers and to mutually different predetermined pseudo-noise code sequences for generating spread spectrum signals providing code division multiplexing; wherein said system comprises on receive side:

a plurality of means responsive to a received signal derived from said radio frequency carrier wave for code division demultiplexing said received signal on the basis of said pseudo- noise code sequences; and wherein:

the outputs of said code division demultiplexing means are then demodulated and given delay corresponding to said predetermined delay and then subjected to adaptive filtering, signal combining and adaptive equalizing to recover said data signal.

2. A time diversity transmission-reception system having a transmission means and a reception means, wherein said transmission means comprises:

a source of digital signal to be transmitted;

delay means connected to said source for giving to said digital signal at least one predetermined delay;

a plurality of modulators connected to said source, one directly and the rest through said delay means, for converting said digital signal into a plurality of modulated intermediate mediate frequency signals;

a plurality of means connected respectively to said modulators for producing, in response to mutually different pseudo-noise code sequences, spread spectrum signals from said modulated intermediate frequency signals;

means for combining said spread spectrum signals into code division multiplexed signals; and transmitter means for transmitting said code division multiplexed signals by a radio frequency carrier wave; and wherein said reception means comprises:

a single receiving antenna for receiving said radio frequency carrier wave through transmission medium, which may involve fading multipath channels;

receiver means for amplifying the output of said receiving antenna and for reproducing therefrom said code division multiplexed signals;

a plurality of means for processing said code division multiplexed signals into code division demultiplexed signals;

a plurality of demodulators for demodulating said code division demultiplexed signals;

delay means for giving to selected ones of the outputs of said demodulators at least one said predetermined delay to restore timed relationship among said demodulator outputs;

a plurality of adaptive matched filters connected to said delay means or said demodulators for subjecting said demodulator outputs with restored timed relationship to adaptive matched filtering;

means for combining the outputs of said adaptive matched filters; and an adaptive equalizer for equalizing the output of said combining means.

3. A time diversity transmission-reception system according to claim 2, in which the number of each of said modulators, spread spectrum signal producing means, code division multiplexed signal processing means and adaptive matched filters is two, and in which the number of said delay means is one.

4. A time diversity transmission-reception system according to claim 2, in which the number of each of said modulators, spread spectrum signal producing means, code division multiplexed signal processing means and adaptive matched filters is four, and in which the number of said delay means is three.

* * * * *

UNITED STATES PATENT AND TRADEMARK OFFICE
CERTIFICATE OF CORRECTION

PATENT NO. : 5,859,870
DATED : January 12, 1999
INVENTOR(S) : Ichiro TSUJIMOTO

It is certified that error appears in the above-identified patent and that said Letters Patent is hereby corrected as shown below:

Column 5, line 35 (equation 2), delete "$W_{12} = E[h*(0)a_n x A_{nl}$" and insert -- $W_{12} = E[h*(0)a_n x A_n]$ --

Column 7, line 43 (equation 14), delete "$y = h(t_0)*xh(t_0)xa_n + h(t_i + t)*xh(t_0 + t)xa_n$" and insert -- $y = h(t_0)*xh(t_0)xa_n + h(t_0 + t)*xh(t_0 + t)xa_n$ --.

Column 10, line 35, claim 2, delete "mediate".

Signed and Sealed this

Twenty-seventh Day of July, 1999

Attest:

Q. TODD DICKINSON

*Attesting Officer*  *Acting Commissioner of Patents and Trademarks*